May 1, 1928.
J. MORGENSTERN ET AL
1,667,814
CABLE CLAMP
Filed March 17, 1926
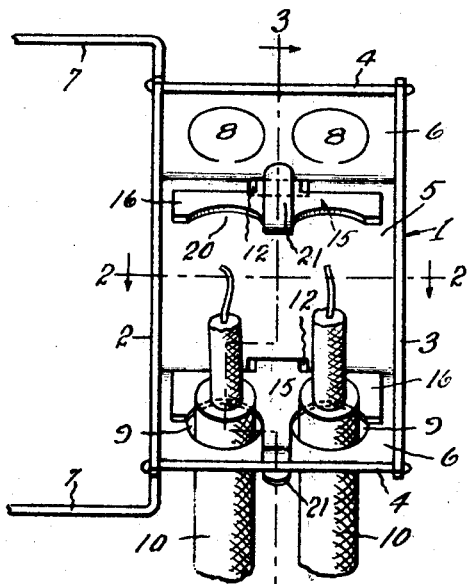
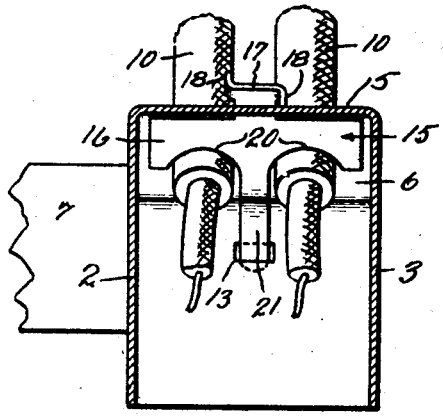
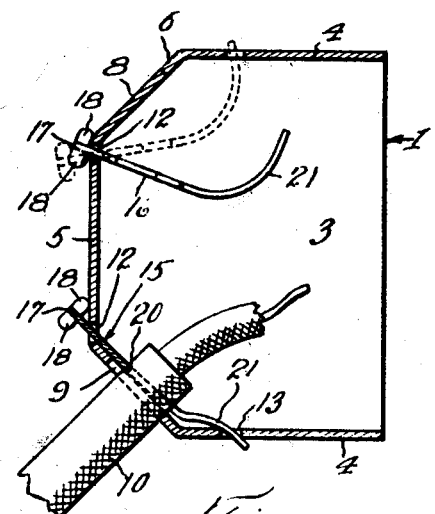
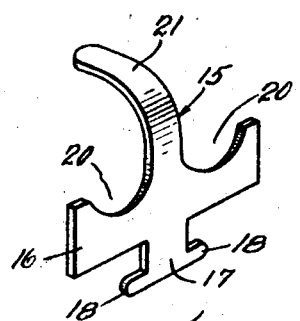
INVENTORS
Joseph Morgenstern
Charles Raus
By Hull, Brock & West
Attys Patented May 1, 1928.

1,667,814

UNITED STATES PATENT OFFICE.

JOSEPH MORGENSTERN AND CHARLES RAUS, OF CLEVELAND, OHIO, ASSIGNORS TO THE NEW ERA ELECTRIC MANUFACTURING COMPANY, OF CLEVELAND, OHIO, A CORPORATION OF OHIO.

CABLE CLAMP.

Application filed March 17, 1926. Serial No. 95,235.

This invention has to do with means for securing cables or conduits of electric wiring systems to receptacles such as switch boxes, outlet boxes, etc.; and it has for its object to provide a highly efficient and thoroughly reliable clamp for the aforesaid purpose that is very cheap and is especially convenient of use, the same being devoid of screws and preferably permanently attached to the receptacle so that there are no disconnected parts to contend with. The clamping action is accomplished through a deformation of the device, and as a consequence thereof there is little liability of its becoming loose; and by reason of its nature, a pull on the cable tends to enhance the hold thereon.

An embodiment of the invention is illustrated in the accompanying drawing, and while we shall proceed to describe the same in detail, it is to be understood that we do not limit ourselves to the specific details shown further than is required by the terms of the appended claims.

In the drawing, Fig. 1 represents a front elevation of a switch box incorporating the invention; Fig. 2 is a sectional plan on the line 2—2 of Fig. 1; Fig. 3 is a vertical section substantially on the line 3—3 of Fig. 1; and Fig. 4 is a perspective view of the clamping element.

The receptacle wherewith we have shown our invention associated is a switch box, the same being designated 1, and it is comprised of side walls 2 and 3, end walls 4, a back wall 5, and diagonal walls 6 which connect the rear edges of the end walls with the adjacent ends of the back wall. Incidentally, the box is shown as formed of an integral piece of material, and brackets 7 extend from the top and bottom edges of the said wall 2 for attaching the box to a suitable support. The diagonal walls 6 are provided with the usual "knockouts" 8 which, when removed, leave openings 9, and cables 10 are adapted to be projected through these openings. These cables may consist of heavily insulated wires, or of conduits of fiber or other suitable material containing ordinary insulated wires that are led into the box or receptacle for attachment to a switch or other unit that is housed therein.

The back wall 5 is provided, adjacent its ends, with slots 12, and the end walls 4 have apertures 13 which are preferably in the vertical plane of said slots. The clamping element, which is designated generally by the numeral 15, and is shown in perspective in Fig. 4, is preferably die stamped from sheet metal, and it consists of a head 16 from the straight rear edge of which projects a shank 17 that is provided with laterally extending lugs 18. The front edge of the head is shown as notched at 20 for the reception of cables, and between the notches is a tongue 21 which, normally, is curved from the plane of the head to a plane at substantially right angles thereto.

In the present example, there are clamping elements associated with both diagonal walls 6, and the shanks 17 of said elements are extended through the slots 12 of the back wall 5. Beyond said wall, the lugs 18 of each shank, are bent in opposite directions, as clearly illustrated in Figs. 2 and 3. These lugs prevent the withdrawal of the shanks from the slots and thus effect a permanent connection of the clamping elements with the receptacle. Before the clamp is put in use it is free to swing with respect to the receptacle and when in the position shown in full lines in Fig. 3 offers no interference with the removal of the "knockouts" 8. From the full line position, the clamping elements may be easily swung to the dotted line position wherein its tongue 21 is projected through the aperture 13 of the corresponding end wall 4.

In the installation of the receptacle, such of the "knockouts" 8 are removed as will accommodate the number and location of the cables that are to be led into the receptacle. The cables are then projected a suitable distance through the openings 9 which are left by the removal of the knockouts and, by the use of a screw driver, chisel, or the like, the clamping elements are bent, as illustrated at the bottom of Fig. 3. When so bent or deformed, the curved walls of the notches 20 embed themselves within the cable or cables that is or are projected into the box, and the lateral thrust imposed by said element upon the cable or cables urge it or them into firm clamping engagement with the opposed edge wall of the opening or openings 9.

Thus it will be seen that, by the use of our invention, the cables may be very effectively clamped to the receptacle by a simple deformation of the clamping element, and inasmuch as the clamping action is the result of actually bending the element, there is little chance of the parts becoming loose. It may be explained, further, that any outward pull on the cable tends to enhance the bite of the element upon the cable which naturally increases the clamping action between said element and the opposed wall of the opening 9.

Having thus described our invention, what we claim is:—

1. In combination with a receptacle having diverging walls and a cable admitting opening adjacent the angle between said walls, a clamping element of relatively stiff bendable material having a part loosely interlocked with a part of one of said walls to movably connect the element to the receptacle and having also a part interengaging a part of the other wall to guide the element in its movements, the element having a cable engaging portion in opposed relation to a wall of the aforesaid opening.

2. In combination with a receptacle involving two diverging walls, each wall having an aperture, the receptacle being provided with a cable admitting opening adjacent the angle between said walls, a clamping element of relatively stiff bendable material having parts extended through said apertures and a part in opposed relation to a wall of the aforesaid opening.

3. In combination with a receptacle having diverging walls and a cable admitting opening adjacent the angle between said walls, each of said walls having an aperture, a clamping element of relatively stiff bendable material provided with a shank which occupies the aperture in one of said walls and a tongue that is guided through the aperture in the other wall, the shank having parts disposed beyond the wall through which it is engaged which serve to prevent the withdrawal of the shank from the aperture of said wall, said element having a cable engaging portion in opposed relation to a wall of the aforesaid opening.

4. In combination with a receptacle having diverging walls and laterally spaced cable admitting openings adjacent the angle between said walls, said walls having apertures in a plane intermediate said openings, a clamping element of relatively stiff bendable material comprising a head from a portion intermediate the ends of which a shank extends in one direction and a tongue in the other, said shank occupying the aperture in one of said walls and the tongue being in entering relation to the aperture in the other wall, portions of the head being opposed to walls of the cable admitting openings.

5. In combination with a receptacle involving diverging walls that are in substantially right angular relation to each other and a diagonal wall intermediate the former walls, the diagonal wall having a cable admitting opening, each of the first mentioned walls having an aperture, and a clamping element of relatively stiff bendable material having parts engaged through the apertures of the diverging walls and incorporating a head in proximity to the cable admitting opening of the diagonal wall, a part of said head being opposed to a wall of the cable admitting opening.

In testimony whereof, we hereunto affix our signatures.

JOSEPH MORGENSTERN.
CHARLES RAUS.